C. L. HEATH.
TAPPET WHEEL FOR PLANTERS.
APPLICATION FILED NOV. 24, 1919.

1,350,997.

Patented Aug. 24, 1920.

WITNESSES

INVENTOR
CLINTON L. HEATH.
BY
ATTORNEYS

C. L. HEATH.
TAPPET WHEEL FOR PLANTERS.
APPLICATION FILED NOV. 24, 1919.
1,350,997.
Patented Aug. 24, 1920.
2 SHEETS—SHEET 2.

Fig. 7. 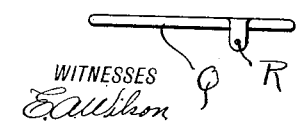 Fig. 8. 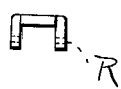 Fig. 9. Fig. 10. 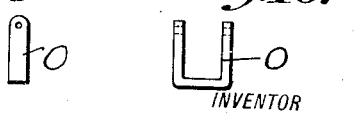
WITNESSES
E. A. Wilson
W. H. Knight
INVENTOR
CLINTON L. HEATH.
BY 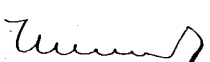
ATTORNEYS

UNITED STATES PATENT OFFICE.

CLINTON LEROY HEATH, OF LESLIE, MISSOURI.

TAPPET-WHEEL FOR PLANTERS.

1,350,997.  Specification of Letters Patent.  Patented Aug. 24, 1920.

Application filed November 24, 1919. Serial No. 340,108.

*To all whom it may concern:*

Be it known that I, CLINTON L. HEATH, a citizen of the United States, and a resident of Leslie, county of Franklin, State of Missouri, have invented a new and useful Tappet-Wheel for Planters, of which the following is a full, clear, and exact description.

As heretofore practiced in planters, particularly wireless check row corn planters, various means have been provided for actuating the seed dropping mechanism, but owing to so many obvious disadvantages arising from the use of these devices they have fallen short of solving the problem in a simple and practical manner.

According to the salient features of the present invention it is proposed to provide a practical manner of actuating the seed dropping mechanism for check row corn planters which will do away with clutches, spring tension devices, friction devices, and other unsatisfactory and complicated means for effecting the desired results.

An illustrated embodiment of the invention is found with reference to the accompanying drawings in which, Figure 1 is a top plan view of a planter illustrating the application of the invention.

Figure 1:
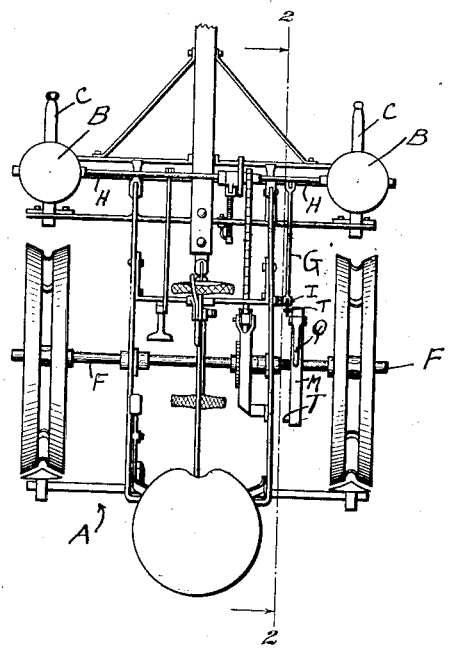
Figure 2:
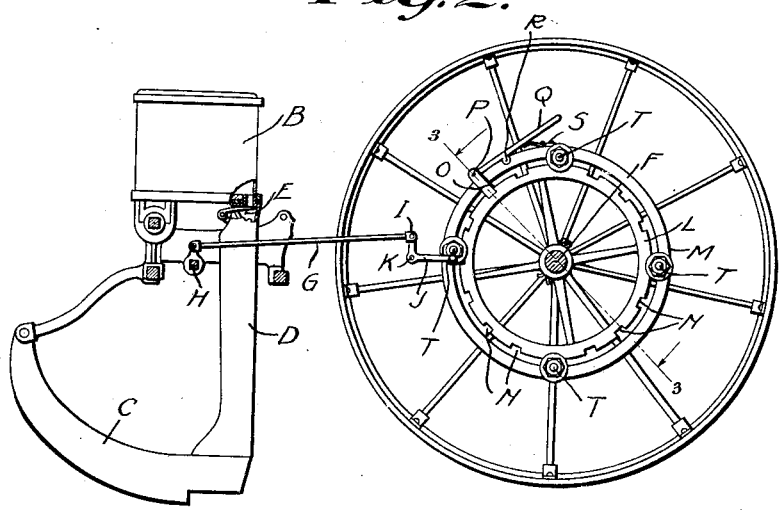
Fig. 2 is a longitudinal sectional view of the line 2—2 of Fig. 1.
Figure 3:
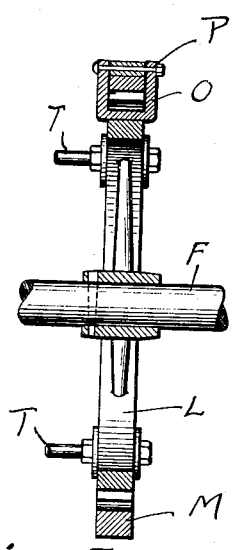
Fig. 3 is a section on the line 3—3 of Fig. 2.
Figure 4:
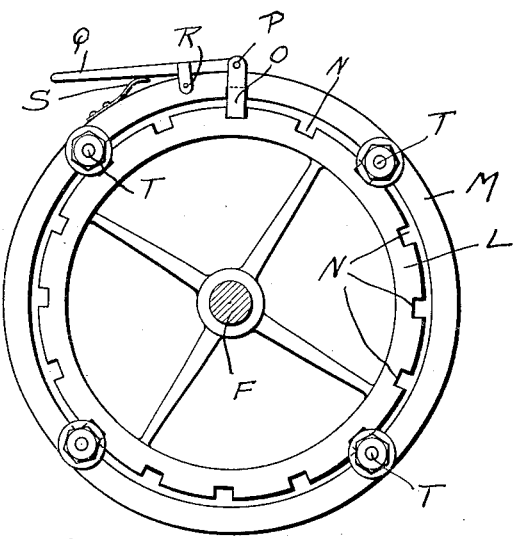
Fig. 4 is a side elevation of the driving and driven elements.
Figure 5:
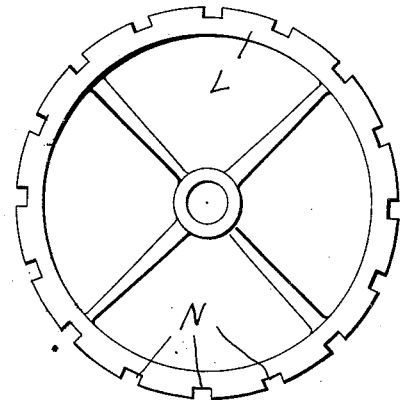
Fig. 5 is a side elevation of the driving element.
Figure 6:
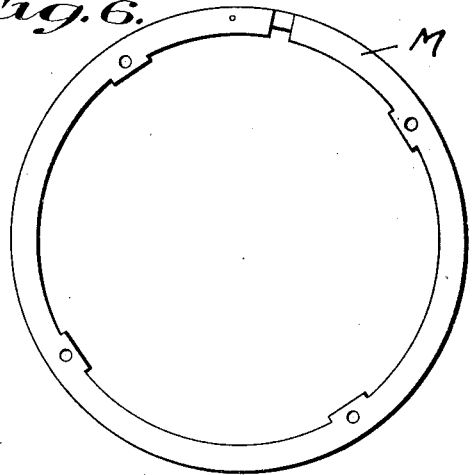
Fig. 6 is a side elevation of the driven element.

Figs. 7 to 10 inclusive are views of the manually operable means for connecting and disconnecting the driving and driven elements, the parts being shown as disassembled.

A represents a planter which for the present purpose can be referred to as a wireless check row corn planter. This planter in so far as the traction wheels, frame, etc. is concerned, may be of any conventional type so long as it is made to accommodate a check row device embodying the characteristics of the present invention. Accordingly the seed hoppers B, with the furrow opening shoes C, the boots D in each of which is mounted a valve E. The traction wheels are constructed in a manner to close the furrow after the seed has been dropped. Co-axially mounted on the axle F of the planter are driving and driven elements for actuating the seed dropping mechanism, which mechanism consists of the rod G which is adapted to actuate the valves E through the rocker rod H in the usual manner. The opposite end of the rod G is pivotally mounted as at I, to a bell crank J which is pivoted as at K. The driving and driven elements preferably comprise an inner and outer rim L and M respectively. The driving element, namely the rim L is of a smaller diameter than the driven element or rim M and is provided with a series of radial slots or notches N in the periphery thereof. These radial slots or notches are made to receive the U shaped pawl O, which is pivoted as at P to a manually operable lever Q which in turn is fulcrumed as at R to a rim M. A leaf spring S on the rim M is presented beneath the lever Q. Under the influence of this spring the end of the lever Q can be lifted thus maintaining the pawl O in one of the radial notches N which will effect a drive connection between the inner and outer rims, thus as the inner rim or driving element is fixed to the axle F the traction of the planter will impart a drive to the inner rim L which will be transmitted to the outer rim M so long as the pawl is received in one of the notches.

Presented at the side of the rim of the driven element are a series of pins or the like T which are spaced at equal distances on the rim and presented radially thereof. These pins T resemble bolts which have nuts threaded thereon with disks made to overlap the side of the rims to maintain the same against radial displacement. The bell crank J of the seed dropping mechanism is presented on the side of the rim M and in the path of the pins T therefore with the rotation of the rim M the pins will effect a wiping contact with the end of the bell crank J and trip the same with the tripping action transmitted through the rod G and the rocker rod H to the valves E whereupon the valves will drop the seeds in the boots D.

By pressing downward on the end of the lever Q the pawl O will be disengaged from the notch which will disconnect the driving and driven elements thus effecting a control of the seed dropping mechanism whereupon the traction of the planter will not effect the dropping of the seeds. The number of pins T which may be employed on the driving element or rim M may be determined according to the number of times it is desired to open the valves E to drop the seed.

By properly using the planter when equipped with the invention, hills of corn or other seed may be dropped in uniform rows with the greatest of ease and efficiency. There is no complicated mechanism to become defective. The check row device may be conveniently applied to various makes of planters without materially departing from the original construction of the planters.

Having thus described my invention what I claim as new and desire to secure by Letters Patent is as follows:—

1. A tappet wheel for planters comprising an inner and outer rim co-axially mounted with one of said rims fast to the axle of the planter and adapted to rotate therewith, lever-operated means for connecting and disconnecting said rim with the other of said rims in driving relation, and axially projecting tappets on the second rim having disks thereon overlying the sides of said first rim to prevent lateral displacement of said rims relative to one another.

2. A tappet wheel for planters comprising an inner and outer rim co-axially mounted with one of said rims fast to the axle of the planter and adapted to rotate therewith, radial notches in one of the adjacent faces of said rims, a lever actuated pawl on the other of said rims adapted to be received in one of said notches for connecting said rims in driving relation, and tappets on the driven rim.

CLINTON LEROY HEATH.